UNITED STATES PATENT OFFICE.

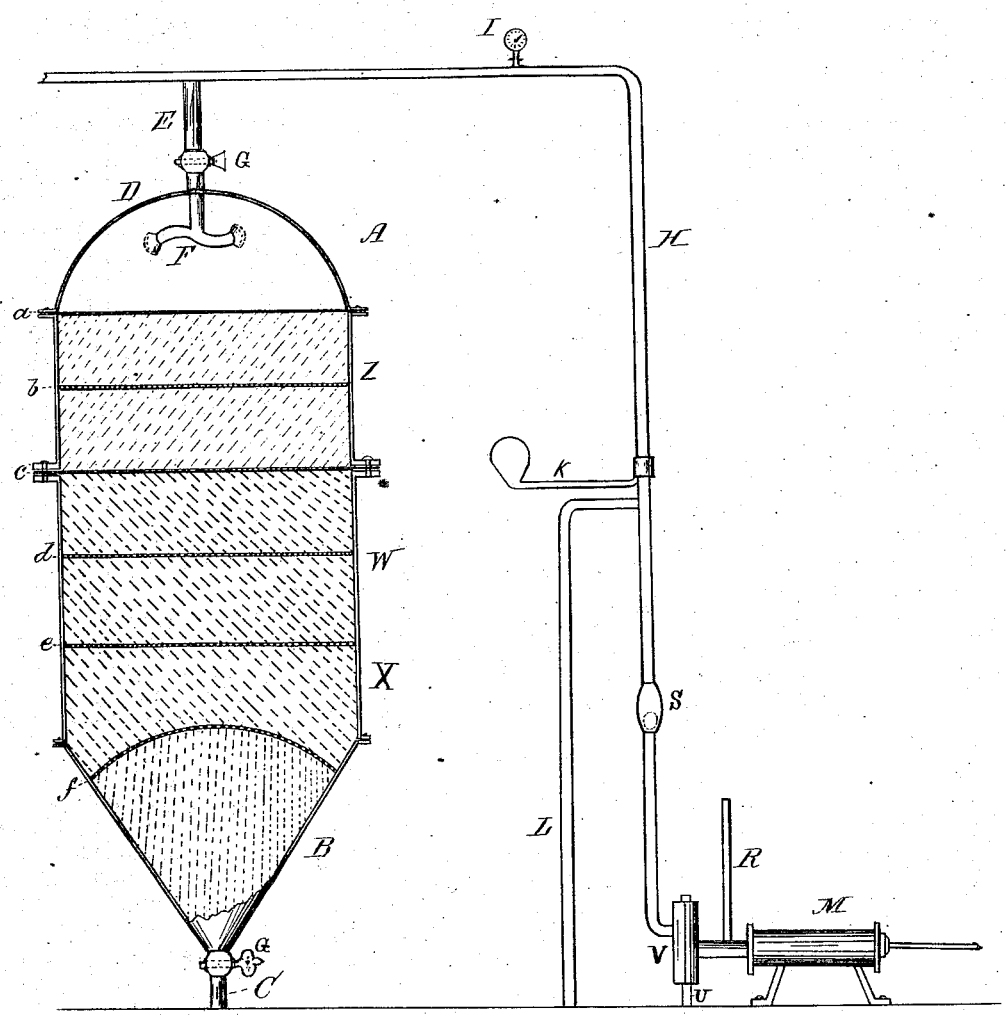

JOSEPH W. REFORD, OF NEW YORK, N. Y., ASSIGNOR OF ONE-HALF HIS RIGHT TO JAMES T. WATERS, OF SAME PLACE.

IMPROVEMENT IN RECTIFYING AND OXYGENATING APPARATUS.

Specification forming part of Letters Patent No. 159,450, dated February 2, 1875; application filed October 1, 1874.

*To all whom it may concern:*

Be it known that I, JOSEPH W. REFORD, of the city, county, and State of New York, have invented certain new and useful Improvements in Rectifying Spirituous Liquors; and I do hereby declare the following to be a full, true, and exact description and specification thereof, reference being had to the accompanying drawings, in which—

Figure 1 is a side elevation of the apparatus used in my process.

Similar letters of reference indicate the same parts.

The objects of this invention are to remove from spirituous liquors all impurities contained therein, the principal one of which is fusel-oil, and, by impregnating the liquor with surplus of oxygen, to impart to the same that property usually only acquired by age.

These objects I accomplish by forcing the liquor to be clarified, in conjunction with a current of atmospheric air, first through a quantity of pulverized charcoal or other absorbent, by which it is partially clarified, and then through a mixture of chloride of lime and peroxide of manganese, or other chemical substance capable of giving out a quantity of pure oxygen gas; then through a quantity of marble-dust. The peroxide of manganese, having an affinity for fusel-oil, readily unites with and absorbs the same, and, with the marble-dust, thoroughly removes the impurities remaining in the liquor after its passage through the pulverized charcoal.

The apparatus which I employ to carry out my process is composed of one or more cylindrical vessels for holding the clarifying medium, constructed of iron or any other suitable metal, preferably of copper, by the use of which I combine strength with lightness. This cylinder is constructed in sections to admit of its being easily taken apart, if desirable, and is provided with several perforated metallic screens covered with canvas, all of which are movable except those at the top, center, and bottom.

The bottom section or compartment of this cylinder is conical or funnel-shaped, and terminates in a discharge-pipe, with a stop-cock attached. In this conical bottom, and upon the first screen, is placed the marble-dust, above which, in the cylinder, and separated by a screen, is placed the peroxide of manganese and chloride of lime or other chemical substance. This may be separated or divided by one or more movable screens, as is deemed advisable, as may also the pulverized charcoal or other substance with which the remaining space is filled. The top or cover of the cylinder is disk-shaped, and is secured in place, when the cylinder is charged, by bolts and nuts, making the whole air-tight. Through this top or cover a pipe is introduced for the passage of the liquor to be rectified. The end of this pipe is provided with a centrifugal distributer, which is operated by the force of the discharging liquor. The upper end of this pipe connects with the liquor-supply pipe, through which the liquor to be treated is forced by a steam-pump or its equivalent, having an air-pipe, in conjunction with a current of atmospheric air at a pressure from one to two hundred pounds to the square inch, and is thereby thoroughly clarified and oxygenated.

In order to obviate the danger of accident or injury to my apparatus from excessive pressure, a safety-valve and pressure-gage, each constructed in the ordinary manner, are attached. The safety-valve operates automatically, and allows a portion of the liquor to escape into the place from whence it was drawn, through a waste-pipe provided for the purpose, when the required pressure is exceeded.

To enable others skilled in the art to understand and use my invention, I will proceed to describe the same.

A is the cylinder containing the clarifying medium. *a b c d e f* represent the screens or partitions. B is the conical bottom of the cylinder; S, check-valve in liquor-supply pipe. C is the discharge-pipe. D represents the top or cover of the cylinder. E is the pipe through which the liquor is introduced. F is the centrifugal distributer attached to the liquor-pipe; G G, cocks for regulating the flow of the liquor. H is the liquor-supply pipe, which is provided with a pressure-gage, I, and safety-valve K. L is the waste-pipe. M represents the piston-cylinder of the force-pump, provided with an air-pipe, R. V is the air-cylinder.

The liquor to be treated is drawn from its receptacle by the pump M, and forced together with a current of air through the supply-pipe H and pipe E into the cylinder A, and is, by the centrifugal distributer F, distributed over the entire upper surface of the screen a. It then passes with the air through the pulverized charcoal in compartment Z, and is partially clarified, and then through the compounds in compartments W and X, where it is thoroughly clarified and impregnated with pure oxygen gas, which imparts to it the property usually acquired by age, and is then discharged in a thoroughly rectified and improved state.

One, two, or any number of cylinders may be used, either together or separately. In case all are not employed at one time the liquor is shut off from the one not required by means of suitable cocks.

I have mentioned pulverized charcoal as the clarifying medium to be used in the first compartment, Z; but any other clarifying substance possessing qualities capable of performing the same functions may be employed.

Instead of the peroxide of manganese and chloride of lime, with which compartment W is filled, and the marble-dust in the lower compartment, X, any substance capable of such a chemical combination with the impurities in the liquor as will liberate oxygen gas, and thereby carry out the oxygenating process, may be used.

By rectification, as herein used, I mean rectification by filtration, and not by sublimation.

I am aware that the forcing of alcoholic vapors combined with atmosphereic air through a filtering medium is not new, and I do not claim it. My invention relates to the treatment of distilled liquors after the process of distillation is completed. I am also aware that a process and machinery for purifying and filtering liquids, substantially as shown in patents granted to T. R. Sinclair, April 27, and July 6, 1869, have been in public use in this country for more than seven years last past, and I do not include the same in this application.

What I claim, and desire to secure by Letters Patent, is—

1. The process of filtering and oxygenating liquors, by forcing them, in combination with atmospheric air under pressure, through purifying and oxygenating substances, as and for the purpose described.

2. In an apparatus for rectifying and oxygenating liquors, the combination of the pump M, the feed-pipe U, the air-supply pipe R, the pipes H and E, provided with pressure-gage and safety-valve, and the cylinder A, having partitions or screens $a\ b\ c\ d\ e\ f$, whereby liquor and air are separately drawn into the air-cylinder of the pump, and are together forced through the filtering-vessel, substantially as described, for the purpose specified.

3. In a liquor rectifying and oxygenating apparatus, the centrifugal distributer F, combined with the cylinder A, containing the horizontal screens, substantially as described, for the purpose specified.

JOSEPH WM. REFORD.

Witnesses:
WM. F. McNAMARA,
W. W. SMITH.